(12) United States Patent
Huber et al.

(10) Patent No.: US 12,448,028 B2
(45) Date of Patent: Oct. 21, 2025

(54) FEEDBACK ACTUATOR FOR A STEERING DEVICE OF A MOTOR VEHICLE AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Goefis (AT); Jean-Pierre Specht, Haag (CH); Tim Bayer, Luechingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 493 days.

(21) Appl. No.: 18/017,590

(22) PCT Filed: Jul. 19, 2021

(86) PCT No.: PCT/EP2021/070067
§ 371 (c)(1),
(2) Date: Jan. 23, 2023

(87) PCT Pub. No.: WO2022/017996
PCT Pub. Date: Jan. 27, 2022

(65) Prior Publication Data
US 2023/0271643 A1 Aug. 31, 2023

(30) Foreign Application Priority Data
Jul. 23, 2020 (DE) .................... 10 2020 209 301.6

(51) Int. Cl.
*B62D 5/00* (2006.01)
(52) U.S. Cl.
CPC .................................. *B62D 5/006* (2013.01)

(58) Field of Classification Search
CPC ............................... B62D 5/005; B62D 5/006
See application file for complete search history.

(56) References Cited

U.S. PATENT DOCUMENTS

| 2004/0011585 A1 | 1/2004 | Menjak et al. |
| 2008/0023257 A1* | 1/2008 | Budaker .............. B62D 5/0412 |
| | | 180/444 |

(Continued)

FOREIGN PATENT DOCUMENTS

| DE | 102004059461 A1 | 6/2006 |
| DE | 102006011212 A1 | 9/2007 |

(Continued)

OTHER PUBLICATIONS

English Translation of International Search Report issued in PCT/EP2021/070067, dated Oct. 6, 2021.

(Continued)

*Primary Examiner* — Kevin Hurley
(74) *Attorney, Agent, or Firm* — thyssenkrupp North America, LLC (57) ABSTRACT

A feedback actuator for a steering device of a motor vehicle may include a steering shaft that is mounted so as to be rotatable about a longitudinal axis extending in a longitudinal direction and that, by way of a belt drive, is coupled to a motor shaft of an electric motor so as to be able to be rotatably driven. The belt drive may have at least one pair of belt pulleys having two belt pulleys that are wrapped by a belt. One of the belt pulleys may be operatively connected to the motor shaft and one may be operatively connected to the steering shaft. The two belt pulleys of the pair of belt pulleys may be disposed so as to be mutually coaxial or at a mutual angle.

14 Claims, 3 Drawing Sheets

(56) References Cited

U.S. PATENT DOCUMENTS

| | | | |
|---|---|---|---|
| 2020/0122768 A1 | | 4/2020 | Swamidason et al. |
| 2020/0148248 A1 | | 5/2020 | Wilske et al. |
| 2020/0189649 A1 | | 6/2020 | Polmans et al. |
| 2020/0346682 A1 | | 11/2020 | Forte et al. |
| 2021/0188342 A1 | | 6/2021 | Bayer et al. |
| 2024/0359725 A1 | * | 10/2024 | Collier-Hallman ......................... B62D 5/0406 |

FOREIGN PATENT DOCUMENTS

| | | |
|---|---|---|
| DE | 10 2015 210 528 A1 | 12/2016 |
| DE | 102017214530 A1 | 2/2019 |
| DE | 212017000220 U1 | 4/2019 |
| DE | 102018101528 A1 | 7/2019 |
| DE | 102018122767 A1 | 3/2020 |
| DE | 102018214917 A1 | 3/2020 |
| WO | 2019005736 A1 | 1/2019 |
| WO | 2019/042531 A1 | 3/2019 |
| WO | 2020043233 A1 | 3/2020 |

OTHER PUBLICATIONS

K.-H. Grote et al., Dubbel Pocketbook for Mechanical Engineering, ISBN 978-3-540-49714-1, 22nd edition, Springer Berlin Heidelberg, New York (2007).

* cited by examiner

FEEDBACK ACTUATOR FOR A STEERING DEVICE OF A MOTOR VEHICLE AND STEERING COLUMN FOR A MOTOR VEHICLE

CROSS REFERENCE TO RELATED APPLICATIONS

This application is a U.S. National Stage Entry of International Patent Application Serial Number PCT/EP2021/070067, filed Jul. 19, 2021, which claims priority to German Patent Application No. DE 10 2020 209 301.6, filed Jul. 23, 2020, the entire contents of which are incorporated herein by reference.

FIELD

The present disclosure generally relates to steering, including feedback actuators for steering devices of motor vehicles.

BACKGROUND

Steer-by-wire steering systems for motor vehicles, like conventional mechanical steering systems, receive manual steering commands of the driver by rotating a steering wheel of an input unit, said steering wheel being attached to the driver-proximal rear end of a steering shaft, the steering spindle, mounted in the steering column. However, the steering shaft by way of the steering gear is not only mechanically connected to the wheels to be steered, but interacts with rotary encoders or torque sensors which detect the entered steering command and therefrom generate an electric control signal and emit the latter to a steering actuator which by means of an electric actuating drive adjusts a steering angle of the wheels that corresponds to the steering command.

As a result of the mechanical coupling being absent, the driver in the case of steer-by-wire systems does not receive any direct physical feedback from the steered wheels by way of the steering train, said physical feedback in the case of conventional mechanically coupled steering systems being transmitted back to the steering wheel as a response torque or self-aligning torque as a function of the carriageway properties, the vehicle speed, the current steering angle and further operating states. The absent haptic feedback makes it difficult for the driver to reliably detect current driving situations and to carry out appropriate steering maneuvers, as a result of which the steering capability of the vehicle and thus the driving safety are compromised.

In order to generate a realistic driving sensation it is known in the prior art to detect from an actual momentary driving situation parameters such as the vehicle speed, the steering angle, the steering response torque and the like, or to calculate those in a simulation and to form therefrom a feedback signal which is fed into a feedback actuator. The feedback actuator is preferably integrated in the steering column of the vehicle and has a manual torque actuator or steering wheel actuator having a drive unit which, as a function of the feedback signal, by way of the steering shaft couples into the steering wheel a self-aligning torque or a feedback torque that corresponds to the real response torque. "Force-feedback" systems of this type impart to the driver the impression of a real driving situation as in a conventional steering system, this facilitating an intuitive reaction.

A generic feedback actuator of the type mentioned at the outset is known from WO 2019/042531 A1, in which a belt drive is disposed as a gearbox for transmitting torque and adapting the rotating speed between the motor and the steering shaft. This belt drive comprises at least one pair of belt pulleys having two belt pulleys of different size, the latter also being referred to as belt wheels, a continuous belt running about said belt pulleys or belt wheels, respectively. The motor-proximal drive belt pulley is attached to the motor shaft of the motor, and the steering shaft-proximal output belt pulley is connected to the steering shaft. The high level of smoothness and the relatively low weight are advantages of the belt drive. As a result of the motor shaft having a radial spacing from the longitudinal axis, said radial spacing for reasons of construction being larger than the sum of the belt pulley radii, a relatively large construction volume is however required, this as a result of the pair of belt pulleys radially projecting from the longitudinal axis being disadvantageous with a view to the constructive integration of the feedback actuator in a steering column.

Thus a need exists to enable an optimized construction mode with a smaller construction volume in a belt-driven feedback actuator.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a feedback actuator for a steering device of a motor vehicle, which in some examples may include a steering shaft that is mounted so as to be rotatable about a longitudinal axis extending in the longitudinal direction and which by way of a belt drive is coupled to the motor shaft of an electric motor so as to be able to be rotatably driven, said belt drive having at least one pair of belt pulleys having two belt pulleys that are wrapped by a belt, one of said belt pulleys being operatively connected to the motor shaft and one being operatively connected to the steering shaft. A steering column for a motor vehicle is likewise the subject matter of the present disclosure.

In a feedback actuator for a steering device of a motor vehicle, comprising a steering shaft which is mounted so as to be rotatable about a longitudinal axis extending in the longitudinal direction and which by way of a belt drive is coupled to the motor shaft of an electric motor so as to be rotatably driven, said belt drive having at least one pair of belt pulleys having two belt pulleys that are wrapped by a belt, one of said belt pulleys being operatively connected to the motor shaft and one being operatively connected to the steering shaft, it is provided according to the invention that the two belt pulleys of the pair of belt pulleys are disposed so as to be mutually coaxial or at a mutual angle.

According to the invention, the two belt pulleys of a pair of belt pulleys by way of which the belt revolves and which thus form a single-stage belt gear, or a gear stage of a belt gear, respectively, are not disposed with a spacing in relation to the longitudinal axis so as to be radially or transversely offset from the latter as in the prior art, but are disposed next to one another, or behind one another, respectively, so as to be coaxial on the longitudinal axis, or are disposed at a mutual angle.

In the coaxial disposal of the two belt pulleys of the pair of belt pulleys the belt pulleys can preferably have an axial spacing. Instead of the radially relatively far projecting belt pulley assembly, the belt pulleys of a pair of belt pulleys, thanks to the invention, can be disposed behind one another in the longitudinal direction, as a result of which an advantageously slim construction shape can be implemented. As a result of the construction mode, which is elongate in the axial direction here, the elongate axial construction space available as a result of the construction length of a steering column in the longitudinal direction can be utilized in an optimum manner for accommodating the belt drive. As a result, the integration of a belt-driven feedback actuator in the casing unit of a steering column is enabled and facilitated, and the specific advantages of the belt drive, such as the low running noise and the low weight, can be utilized in an optimum manner in a steer-by-wire steering system.

The disposal at an angle is understood to mean that the belt pulleys have in each case a rotation axis, wherein these rotation axes are disposed at a mutual angle, i.e. not mutually parallel.

The angle of the rotation axes is preferably between 10° and 80°, particularly preferably between 30° and 60°, most preferably 45°.

In a belt drive according to the invention, at least one continuous belt runs by way of the two belt pulleys of a pair of belt pulleys that are axially offset or disposed at an angle, said two belt pulleys both being wrapped by the revolving belt. The belt pulleys can preferably be disposed so as to be coaxial on the longitudinal axis and be mounted so as to be rotatable relative to the latter which coincides with the motor axis of the motor shaft and the steering shaft.

The two belt pulleys of a pair of belt pulleys preferably have dissimilar diameters according to the gear ratio. As a result of the axial disposal according to the invention, the required radial construction volume is provided by the diameter of the larger belt pulley and in this way is in each case advantageously smaller than in the prior art in which the diameter of the other belt pulley has to be added in the radial direction.

One advantageous embodiment provides that the belt is disposed so as to be parallel to a belt plane which is disposed so as to be oblique relative to the longitudinal axis. The strands, specifically the free belt portions, extend between the regions in which the belt bears on the running surfaces or the belt running surfaces at the belt pulleys, and specifically essentially in a straight manner with the exception of slight flexing due to play in the belt. While both strands in the prior art are perpendicular to the longitudinal axis, thus run in a strand or belt plane which is defined by the strands and is perpendicular to the longitudinal axis, the strands in the invention run so as to be obliquely inclined relative to the longitudinal axis between the axially spaced-apart running surfaces on the circumference of the two belt pulleys. The angle of inclination of the strands, and thus of the strand or belt plane defined by said strands, in relation to the longitudinal axis is less than 90° and more than 0°. As a result of the obliquely disposed belt, the drive torque can be transmitted between the two coaxially disposed belt pulleys by a single belt, as a result of which no radial construction space, or only a minor amount of radial construction space, outside the diameter of the belt pulleys is advantageously required, the maximum being caused by the thickness of the belt.

The belt drive according to the invention, having the belt revolving obliquely in relation to the common rotation axis of the two belt pulleys of a pair of belt pulleys, or in other words in which the strands run diagonally in relation to the common longitudinal axis between mutually opposite running surface portions of the two belt pulleys, can also be referred to as an oblique or diagonal belt drive. This oblique belt concept is not provided in the conventional belt drives such as in the prior art mentioned at the outset. An advantageously compact and axial construction mode, specifically of one or a plurality of pairs of belt pulleys disposed axially behind one another, i.e. stages of a multiple-stage belt drive, is made possible by the implementation according to the invention. The lightweight construction mode and the advantageous torque transmission characteristic of a belt drive is maintained here, this being particularly favorable with a view to the application in a feedback actuator and the integration in a steering column.

The angle of inclination of the belt is a function of the axial spacing and of the diameter of the belt pulleys, wherein a small spacing and/or a large diameter lead to a larger angle of inclination, and a large spacing and/or a small diameter lead to a smaller angle of inclination.

One advantageous implementation of the invention can take place in that the two belt pulleys have in each case a conical basic shape, having belt running surfaces which on the external sides of the belt pulleys that face away from one another axially conically converge in the direction of the longitudinal axis. The belt running surfaces, also referred to as running surfaces for short, describe the circumferential faces of the belt pulleys on which the belt by way of the internal side thereof bears, the internal side being situated on the internal circumference of the closed belt loop that encircles both belt pulleys. In the oblique belt drive according to the invention, the internal side of the belt is likewise inclined toward the belt pulleys, according to the angle of inclination in relation to the longitudinal axis. As a result of the belt running surfaces being inclined toward the vertical by this angle of inclination, the obliquely revolving belt, in each case across the entire width of the internal face thereof, can contact the belt running surface as a result of which an efficient and reliable transmission of force and torque between the belt and the belt pulleys is guaranteed.

In a pair of belt pulleys of the oblique belt drive according to the invention, the belt running surfaces of each belt pulley slope axially in the outward direction of the longitudinal axis, i.e. axially converge in a conical manner, wherein the external side is defined by the side that axially faces away from the respective other belt pulley of the pair of belt pulleys. In other words, with the exception of dissimilar diameters, a mirror-symmetrical arrangement of the belt running surfaces of both belt pulleys in terms of a transverse plane that is perpendicular to the longitudinal axis is provided, this corresponding to the oblique profile of the strands or of the belt plane, respectively. For example, the belt running surfaces for a simple flat belt may have a cone-shaped basic shape. In the axial disposal according to the invention, the running surfaces of a pair of belt pulleys are delimited by an envelope in the shape of a double cone, and the belt runs externally about both cone faces, so as to be inclined in relation to the cone axis. As a result of the conical basic shape that is adapted to the inclination of the belt, the torsion of the belt can be reduced such that there is less tumbling movement and the load on the belt is reduced.

In order for the operational reliability to be increased, the running surfaces can be shaped so as to be convexly spherical toward the outside, as is known per se in belt drives, in other words be cambered. This results in a self-acting alignment and centering of the belt on the belt running surface when revolving about the belt pulleys. Alternatively or additionally, the belt pulley may have one or two flanged pulleys, or portions in the manner of flanged pulleys, which restrict the sideways movement of the belt during operation.

It can be provided that the belt drive has a flat belt and/or a V-belt and/or a timing belt. If the belt is a flat belt, a structurally particularly simple implementation of the belt pulley in the form of a bevel wheel, in which the belt running surfaces have a simple conical or cone-shaped basic shape, can take place, this requiring little complexity in terms of construction, production and assembly. The complexity is not increased by an optional spherical-convex design embodiment.

Alternatively, a belt can be configured as a V-belt. According to the invention, the belt pulleys have tapered grooves that correspond to the belt cross section. These tapered grooves per se already have a wedge-shape groove cross section having conical lateral flanks, the latter however not relating to the conical arrangement of the belt running surfaces. According to the invention, it may indeed be more advantageous for the wedge-shaped groove cross section in its entirety to be inclined so as to correspond to the angle of inclination of the belt, or of the strands, respectively, relative to the longitudinal axis. In this way, the known advantageous transmission characteristics of V-belts, such as a high degree of efficiency and low-slippage transmission, can be utilized for the oblique belt drive according to the invention.

As a result of a belt being configured as a timing belt, a practically slippage-free, form-fitting transmission of force and torque with a high degree of efficiency is obtained, even of relatively high torques. This benefits a compact construction mode in a steering column.

It is conceivable and possible that the belt drive is configured in two or multiple stages. Here, each individual gear stage of a belt gear can be formed by one oblique belt drive according to the invention, having one pair of belt pulleys. Two or more such oblique belt drives can be cascaded in the axial direction so as to form a multiple-stage belt gear, wherein all of the belt wheels are disposed coaxially on the longitudinal axis. Besides the simple and compact construction, a further advantage of the multiple-stage belt drive lies in that for a required overall gear ratio the gear ratio of each individual stage can be lower, as a result of which belt pulleys having smaller diameters can be used, an advantageously smaller radial dimension being able to be implemented as a result.

In order for a multiple-stage belt gear to be implemented, it may be advantageous for at least one layshaft to be disposed between the motor shaft and the steering shaft, said layshaft having two belt pulleys which are coaxial (in terms of the layshaft axis) and connected in a rotationally fixed manner. The drive-proximal drive or motor belt pulley, which is connected to the motor shaft, conjointly with the drive-proximal or motor-proximal belt pulley of the layshaft, thus a first intermediate belt pulley, here forms a pair of belt pulleys according to the invention that are coupled by an oblique belt. The output-proximal or steering shaft-proximal belt pulley of the layshaft, also referred to as the second intermediate belt pulley, conjointly with the steering shaft-proximal output or steering shaft belt pulley forms a further gear stage designed according to the invention. The two belt pulleys of the layshaft here have dissimilar diameters which according to the targeted overall gear ratio are adapted to the diameters of the motor and steering shaft belt pulleys.

In one advantageous refinement it can be provided that the layshaft is disposed so as to be coaxial with or at an angle to the motor shaft or to the steering shaft. In other words the layshaft can be disposed so as to be coaxial with the motor shaft or with the steering shaft, or the layshaft can be disposed so as to be coaxial with the motor shaft and with the steering shaft, or the layshaft is disposed at an angle to the motor shaft or to the steering shaft, or the layshaft is disposed at an angle to the motor shaft and to the steering shaft.

A two or multiple-stage belt drive can be implemented by the use of a layshaft. It is also possible for further, likewise coaxial, layshafts to be provided for forming further gear stages, the latter potentially being connected to one another by way of oblique belt drives according to the invention.

With a view to reliable, low-slippage and smooth running it can be advantageous for a tensioner installation for tensioning the belt to be provided. It is achieved as a result that a basic tension in the direction of the belt is maintained independently of the state of the load in the strands.

It can be provided that the tensioner installation has a tensioning means which stresses at least one strand of the belt with a tensioning force transverse to the extent of the belt. As a result of a contact pressure force being applied transversely to the one strand from the outside or from the inside, thus parallel to the strand or belt plane defined above, by means of a tensioning means such as, for example, a rotatably mounted contact pressure roller, preferably in the central region of the freely running belt, a longitudinal force is generated in the strand and the belt is tensioned between the belt running surfaces. For example, the tensioning means can be elastically applied, for example by means of a pre-loaded spring element as a spring-loaded contact pressure roller which can roll, preferably on the outside, or on the inside, of the belt, or as a skid on which the belt can slide. It is possible for only the one strand, thus the stressed strand or the slack strand, to be loaded in the direction toward the other stand, or else for both strands to be compressed between two tensioning means directed toward one another. As a result, it is also advantageously possible for the angle of wrap, and thus the length of the belt running surface on which the belt contacts the belt pulleys, to be enlarged. The torque-transmission capability and thus the output-transmission capability can be increased as a result.

Alternatively or additionally to the elastic pre-loading, the tensioning means can be designed so as to be adjustable, for example by means of a grub screw be pushed in a defined manner against the strand so far until the required belt tension has been reached.

There is furthermore the possibility that guiding means, which hold or support the belt in a defined position in relation to the belt running surfaces are provided. For example, the guiding means can laterally support one or both of the strands such that the position and orientation of said strands in relation to the belt pulleys is maintained.

It is conceivable and possible for the tensioner installation to have guiding means. For example, a contact pressure roller may have radially projecting protrusions or flanges between which the belt in the strand can run in a guided manner. The guiding means can also be embodied independently of a tensioner installation, for example as lateral delimitation elements which have sliding faces, guide rollers or the like that delimit the freedom of movement of the belt transversely to the longitudinal extent of the latter.

The invention furthermore relates to a steering column for a motor vehicle, comprising a casing unit which is attachable to a motor vehicle body and in which a steering shaft is mounted so as to be rotatable about the longitudinal axis thereof extending in the longitudinal direction, a steering wheel being attachable to said steering column, and the latter being connected to a feedback actuator which has an electric motor and a belt drive for generating and coupling a feedback torque into the steering shaft, in which steering column the feedback actuator is configured according to one or a plurality of the design embodiments described above.

As a result of the slim construction mode with a relatively minor radial dimension, made possible according to the invention, a feedback actuator having a belt drive can be integrated with a relatively minor complexity in terms of production and assembly in a compact steering column that requires little construction volume. The weight-saving belt drive is advantageous for an energy-saving lightweight construction mode. The low-noise operation, which is specific to the belt drive, and the jolt-free and smooth transmission of the feedback torque herein are considered to be particularly agreeable in haptic terms.

The feedback actuator can preferably be attached to the casing unit, preferably integrated in a casing tube or a guide box. A compact and protected accommodation in the vehicle interior is an advantage here.

One advantageous design embodiment can provide that the feedback actuator is disposed in an internal casing which in the longitudinal direction is adjustable relative to the casing unit. A length-adjustable steering column has a casing unit having an external casing, also referred to as the outer casing tube or the guide box, in which an internal casing, also referred to as the inner casing tube, is received so as to be telescopically adjustable in the longitudinal direction, i.e. in the direction of the longitudinal axis. The steering shaft or steering spindle is mounted in the internal casing, the steering wheel being attached to the rear, driver-proximal end of said steering shaft or steering spindle. As a result of the advantageous construction mode, the feedback actuator according to the invention can also be completely integrated in an internal casing with a relatively small volume. This enables a greater degree of freedom in the design of compact, stowable steering columns for autonomous driverless vehicles, wherein a space-saving accommodation of the steering column during the autonomous driverless operation is made possible.

It can be provided that the casing unit is held by a support unit which is able to be connected to the body of the motor vehicle. As a result of the telescopic adjustment of the inner casing and the outer casing, a longitudinal adjustment in the direction of the longitudinal axis of the steering spindle can be implemented.

It is possible for the casing unit to be adjustable in the height direction relative to the support unit. A height adjustment of this type can be implemented in a manner known per se, for example, in that an external casing in the steering wheel-distal region, i.e. the front region in the direction of travel, is mounted on the support unit so as to be pivotable upward and downward about a horizontal pivot axis which is disposed transversely to the longitudinal direction. As a result, the steering wheel attached to the rear of the steering spindle in the vehicle interior can be adjusted in terms of height.

The length adjustment and height adjustment can be provided individually or in combination, depending on the requirement. The adjustment here can take place manually or by means of motorized adjustment drives.

Figure 1:
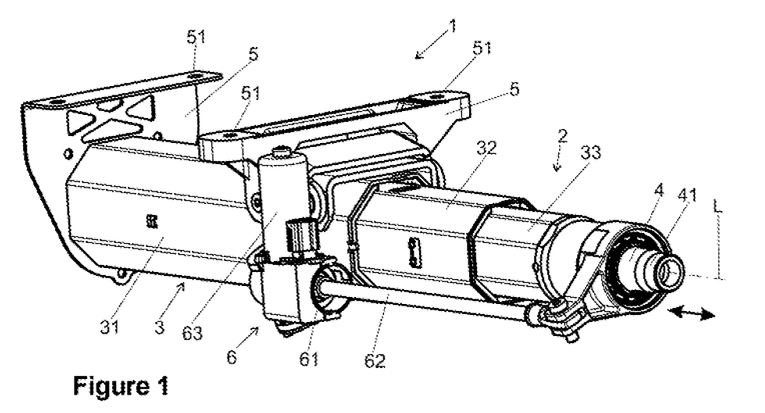
FIG. 1 is a schematic perspective view of an example steering column.
Figure 2:
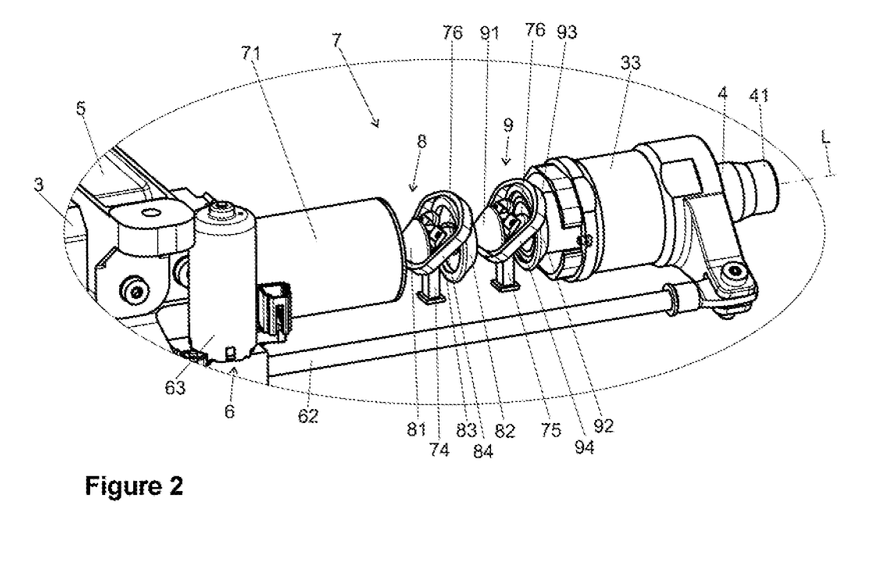
FIG. 2 is a schematic standalone perspective view of a feedback actuator of the steering column according to FIG. 1.
Figure 3:
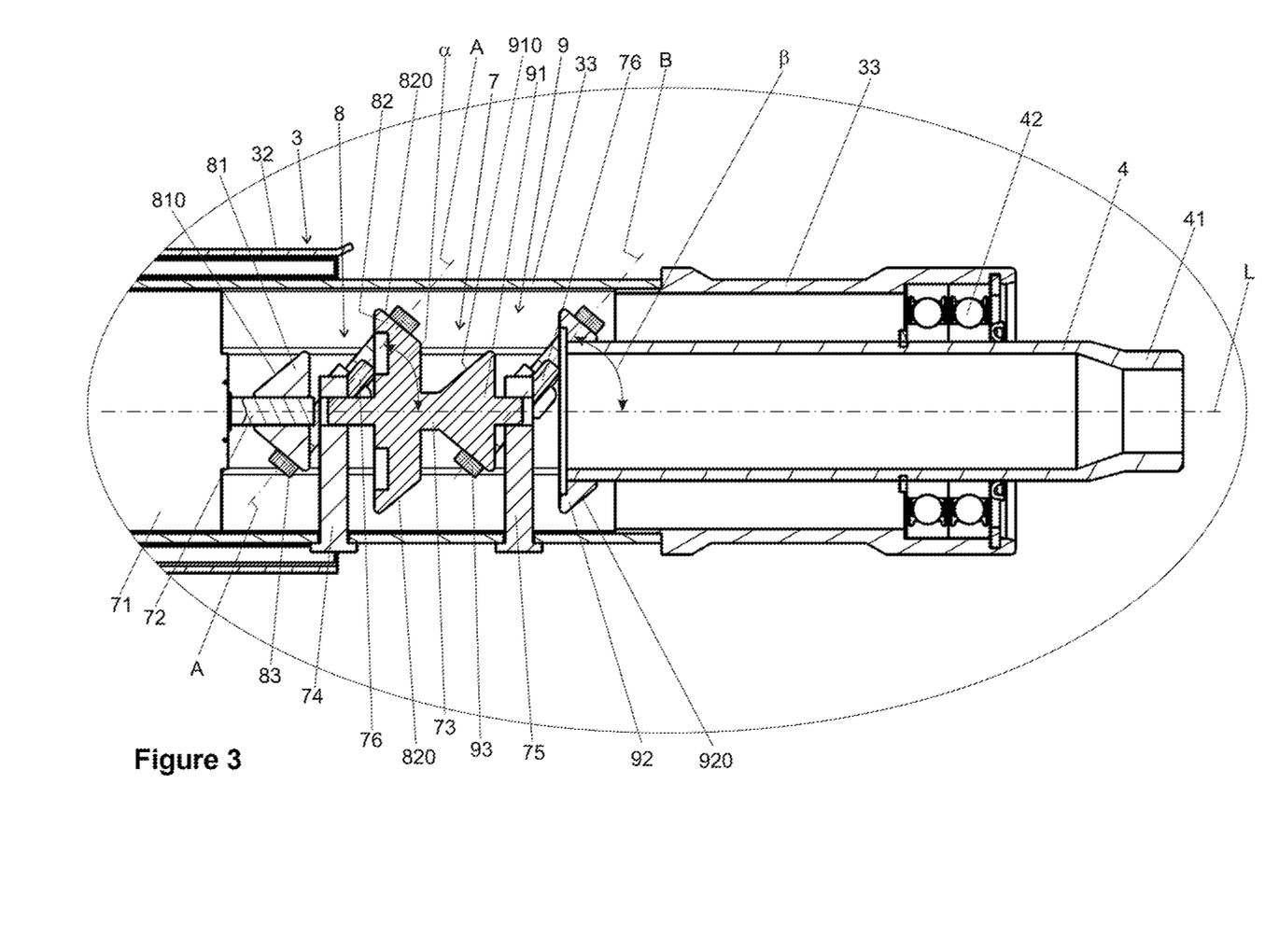
FIG. 3 is a longitudinal sectional view through a belt drive of the feedback actuator according to FIG. 2.

FIG. 1 shows a steering column 1 according to the invention in a perspective view obliquely from the rear in terms of the direction of travel. FIG. 2 shows a partially sectional, or cut-away partial, view of the steering column 1, and FIG. 3 shows a partial longitudinal section.

The steering column 1 has an actuating unit 2. The actuating unit 2 comprises a casing unit 3 having three casing tubes 31, 32, 33, specifically an external casing tube 31, an intermediate casing tube 32, and an internal casing tube 33. The casing tubes 31, 32 and 33 are disposed coaxially inside one another and telescopically displaceable in the longitudinal direction, the latter corresponding to the direction of a longitudinal axis L, as a result of which a longitudinal adjustment is made possible as indicated by the double arrow. The casing tubes 31, 32, 33 for shortening the steering column 1 can be collapsed, i.e. retracted in the longitudinal direction up to a maximum stowage position, and conversely be deployed from the stowage position in the direction of an operating position.

Alternatively, a merely two-part telescopic assembly can be formed from an external casing tube 31 and an internal casing tube 33, thus without an intervening intermediate casing tube 32. In another alternative, one or more further intermediate casing tubes 32 may be fitted in order for a multiple telescope to be formed.

A steering spindle 4, also referred to as a steering shaft 4, is mounted in the casing unit 3 so as to be rotatable about the longitudinal axis L, said steering spindle 4 at the rear end thereof having a connector portion 41 for attaching a steering wheel not illustrated.

The casing unit 3 is held in a two-part support unit 5 which has fastening means 51 for attaching to a vehicle body not illustrated.

An adjustment drive 6 is provided for the motorized longitudinal adjustment, said adjustment drive 6 having a spindle drive having a spindle nut 61 and a threaded spindle 62 screwed into the latter, said spindle nut 61 and said threaded spindle 62 being able to be rotatably driven relative to one another by an electric motor 63. An immersion spindle drive is implemented as a result.

The threaded spindle 62 extends parallel to the longitudinal axis L and is connected to the internal casing tube 33. The spindle nut 61 by way of the adjustment drive 6 is supported in the longitudinal direction on the external casing tube 31. The threaded spindle 62 and the spindle nut 61 are converged or diverged, depending on the direction of rotation, by a relative rotation by means of the motor 63, as a result of which the internal casing tube 33 in the axial direction can either be retracted into the external casing tube 41, or in the opposite direction, a deployment direction, can be deployed from the external casing tube 31. As a result, a steering wheel attached to the connector portion 41 can selectively be moved toward the front to a stowage position in which the internal casing tube 33 and the intermediate casing tube 32 are retracted into the external casing tube 31, i.e. lowered toward the front, or can be moved rearward to an operating position in which the casing tubes 31, 32 and 33 are diverged.

Alternatively, the spindle nut 61 can be supported on the internal casing tube 33, and the threaded spindle 62 can be supported on the external casing tube 31.

Alternatively, it is possible for a rotary spindle drive to be configured by a rotating drive of the threaded spindle 62 and a spindle nut 61 that is attached so as to be stationary on a casing tube.

FIG. 2 shows a perspective partial view of the steering column 1, wherein the internal casing tube 33 is schematically illustrated so as to be translucent or omitted, respectively, such that the view into the interior is unobstructed. A longitudinal section along the longitudinal axis L through the assembly shown in FIG. 2 is shown in FIG. 3.

Disposed in the internal casing tube 33 is a belt-driven feedback actuator 7 according to the invention, said feedback actuator 7 according to the invention comprising a first belt drive 8 and a second belt drive 9 which are of identical construction and as gear stages of a belt gear are operatively disposed in series. The motor shaft 72 for coupling in the feedback torque is connected to the steering shaft 4 by way of the belt drives 8 and 9, said steering shaft 4 in a bearing assembly 42 in the internal casing tube 33 being mounted so as to be rotatable about the longitudinal axis L.

The feedback actuator 7 has an electric motor 71 which is fastened in the internal casing tube 33 and has a motor shaft 72 which is coaxial with the longitudinal axis L and is able to be selectively driven in a rotating manner in both directions of rotation. A first belt pulley 81 is fastened on the motor shaft 72, likewise so as to be coaxial with the longitudinal axis L. Said first belt pulley 81 is configured so as to be conical, having an externally encircling belt running surface 810 which proximal to the motor converges conically in the direction of the longitudinal axis L.

A layshaft 73 is axially spaced apart from the motor shaft 72, i.e. mounted in two bearing supports 74 and 75 attached to the internal casing tube 33 at a spacing in the longitudinal direction defined by the longitudinal axis L, and so as to be coaxial with and rotatable about the longitudinal axis L.

A second belt pulley 82 is fixed so as to be rotationally fixed on the layshaft 73 and coaxial with the longitudinal axis L, for example as illustrated as a result of an integral configuration with the layshaft 82, for example as a plastic injection-molded part, or made in a subtractive manner or as a casting from metal. This second belt pulley 82 is configured so as to be conical, having an externally encircling belt running surface 820 which proximal to the steering shaft converges conically in the direction of the longitudinal axis L, thus in terms of the conical shape of the belt running surface 810 of the belt pulley 81 being mirror-symmetrical in relation to a transverse plane of the longitudinal axis L.

The two belt pulleys 81 and 82 for forming the belt drive 8 are wrapped by a belt 83 which ensures a transmission of torque and is configured as a flat belt. The belt 83 bears in a friction-fitting manner on the belt running surfaces 810 and 820. The belt pulley 81 has a smaller diameter than the belt pulley 82, the gear ratio of the belt drive 8 being determined as a result.

The strands which are formed by the free belt portions between the two belt pulleys 81 and 82 run parallel to a strand plane A of the first belt drive 8, which is plotted using dashed lines in FIG. 3 and is also referred to as the belt plane A. The belt 83 extends in a closed belt loop which encircles the belt pulleys 81 and 82 and is parallel to the strand plane or belt plane A.

According to the invention, the strand plane A is oblique in relation to the longitudinal axis L, thus at an inclination angle α (alpha) which deviates from a right angle and is less than 90° and more than 0°, preferably is in a range between 20° to 70°, particularly preferably between 30° and 60°.

The inclination angle α is determined by the axial spacing of the two belt pulleys 81 and 82 as well as by the diameters of said two belt pulleys 81 and 82.

The belt running surfaces 810 and 820 are inclined so as to be conical in relation to the longitudinal axis L, in accordance with the inclination α of the strand plane A, in such a manner that the belt 83 bears thereon perpendicularly to the strand plane A. Accordingly, the belt running surface 810 is inclined by (α+90°), while the other belt running surface 820 is inclined by (α−90°).

A third belt pulley 91 is fixed in a rotationally fixed manner on the layshaft 73, so as to be coaxial with the longitudinal axis L and at a spacing from the belt pulley 82, for example as illustrated by an integral configuration conjointly with the layshaft 82 and the second belt pulley 82, for example as a plastic injection-molded part, or made in a subtractive manner or as a casting from metal.

The third belt pulley 91 is conically configured, having an externally encircling belt running surface 910 which, as with the first belt pulley 81, proximal to the motor converges conically in the direction of the longitudinal axis L.

A fourth belt pulley 92 is fixed on the layshaft 4 so as to be axially spaced apart from the belt pulley 91, said fourth belt pulley 91 being conically configured having an externally encircling belt running surface 920 which, as with the second belt pulley 92, proximal to the steering shaft converges conically in the direction of the longitudinal axis L, thus in terms of the conical shape of the belt running surface 910 of the belt pulley 91 is mirror-symmetrical to a transverse plane of the longitudinal axis L.

The two belt pulleys 91 and 92 for forming the belt drive 9 are wrapped by a belt 93 which ensures a transmission of torque and is configured as a flat belt. The belt 93 bears in a friction-fitting manner on the belt running surfaces 910 and 920.

The belt pulley 91 has a smaller diameter than the belt pulley 92, the gear ratio of the second belt drive 9 being determined as a result.

The strands formed by the free belt portions between the two belt pulleys 91 and 92 run parallel to a strand plane B of the second belt drive 9, which is plotted using dashed lines in FIG. 3 and is also referred to as the belt plane B. The belt 93 extends in a closed belt loop that encircles the belt pulleys 91 and 92 and is parallel to the strand plane or belt plane B.

According to the invention, the belt plane B is oblique in relation to the longitudinal axis L, thus at an inclination angle β (beta) which deviates from a right angle and is less than 90° and more than 0°, preferably is in a range between 20° and 70°, particularly preferably between 30° and 60°.

The inclination angle β is determined by the axial spacing of the two belt pulleys 91 and 92 as well as by the diameters of said two belt pulleys 91 and 92.

The belt running surfaces 910 and 920 are inclined so as to be conical in relation to the longitudinal axis L, in accordance with the inclination β of the strand plane B, in such a manner that the belt 93 bears thereon perpendicularly to the strand plane B. Accordingly, the belt running surface 910 is inclined by (β+90°), and the other belt running surface 920 is inclined by (β−90°).

The overall gear ratio of the belt gear between the motor shaft 72 and the steering shaft 4 is derived from the product of the gear ratios of the two belt drives 8 and 9.

If required, even further layshafts may be provided, which in this instance can likewise be disposed axially between the motor shaft 72, the steering shaft 4 and the further layshafts 73.

A tensioner installation having in each case at least one tensioning means which exerts a contact pressure force transverse to the extent of the belt 83 or 93 and which loads the two strands against one another or else away from one another such that a belt tension can be generated, can be provided for each of the two belt drives 8 and 9. A tensioner installation can have, for example, a spring-loaded contact pressure roller 76 acting on the belt 83 or 93.

Figure 4:
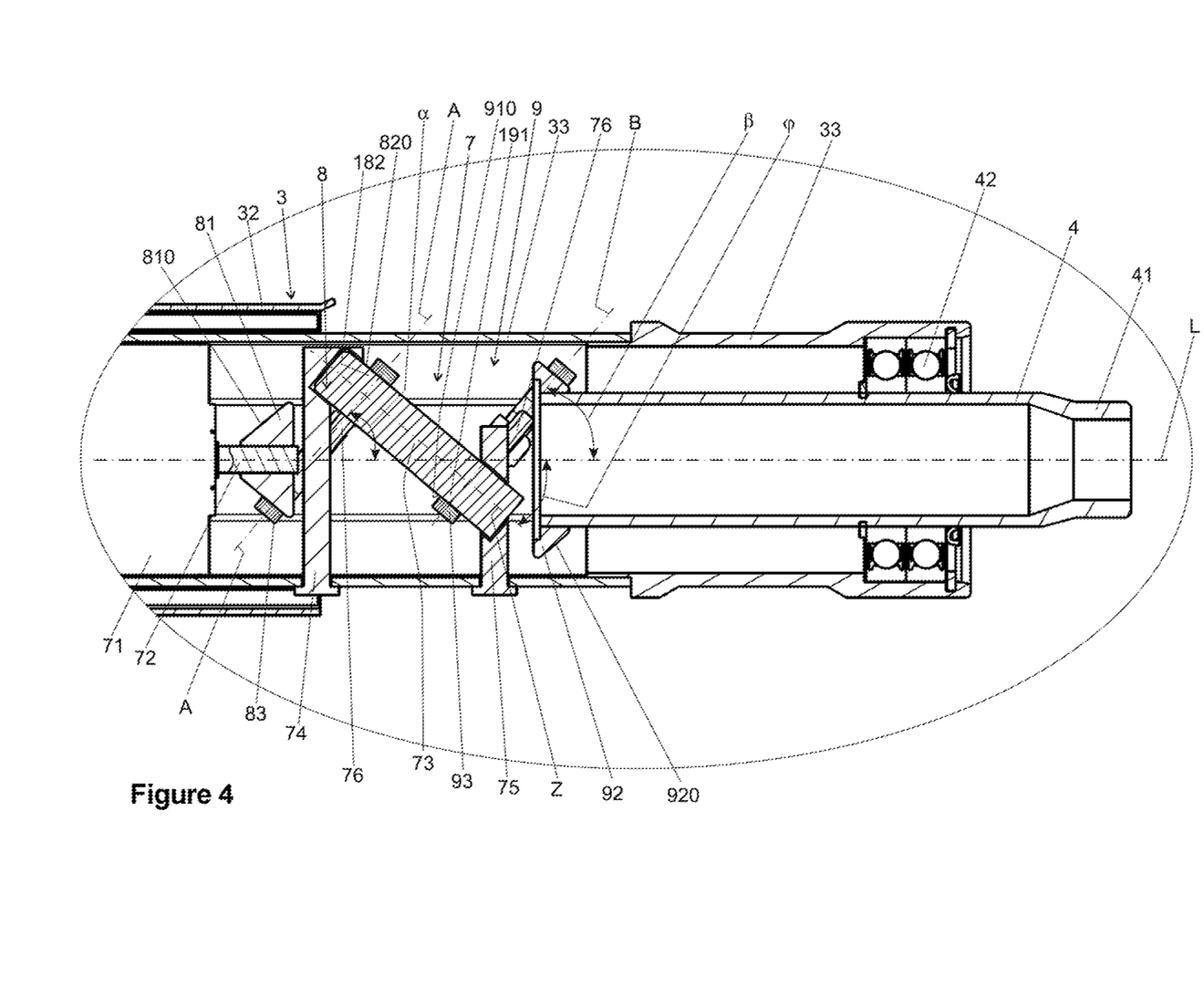
FIG. 4 is a longitudinal sectional view through another example belt drive of a feedback actuator.

A longitudinal section through a belt drive of the feedback actuator according to the invention in a further variant of embodiment is illustrated in FIG. 4, wherein this further variant of embodiment has a layshaft 73 which is disposed at an angle φ in relation to the motor shaft 72 and in relation to the steering shaft 4. The belt pulleys 182, 191 are configured integrally with the layshaft 73, wherein the belt pulley 182 conjointly with the belt pulley 81 forms a pair of belt pulleys, and wherein the belt pulley 182 is disposed at an angle in relation to the belt pulley 81, i.e. the rotation axis of the belt pulley 182, which corresponds to the layshaft axis Z, is disposed at an angle to the rotation axis of the belt pulley 81, which corresponds to the longitudinal axis L or the motor shaft axis, respectively.

The belt pulley 191 conjointly with the belt pulley 92 forms a pair of belt pulleys, wherein the belt pulley 191 is disposed at an angle in relation to the belt pulley 92, i.e. the rotation axis of the belt pulley 191, which corresponds to the layshaft axis Z, is at an angle in relation to the rotation axis of the belt pulley 92, which corresponds to the longitudinal axis L.

The belt pulley 182 has a belt running surface 820, and the belt pulley 191 has a belt running surface 910, said belt running surfaces 820, 910 operatively engaging in each case with the corresponding belt 83, 93.

The layshaft 73 is rotatably mounted in the bearing supports 74, 75 and is supported on the respective bearing support 74, 75 so as to be secured in relation to being repositioned in the direction of the layshaft axis Z.

All explanations pertaining to FIG. 3 can be applied in a substantially analogous manner to FIG. 4 and will therefore not be discussed again.

LIST OF REFERENCE SIGNS

1 Steering column
2 Actuating unit
3 Casing unit
31 External casing tube
32 Intermediate casing tube
33 Internal casing tube
4 Steering spindle (steering shaft)
41 Connector portion
42 Bearing assembly
5 Support unit
51 Fastening means
6 Adjustment drive
61 Spindle nut
62 Threaded spindle
63 Motor
7 Feedback actuator
71 Motor
72 Motor shaft
73 Layshaft
74, 75 Bearing support
76 Contact pressure roller
8, 9 Belt drive
81, 91 Belt pulley
82, 92 Belt pulley
810, 820 Belt running surface
910, 920 Belt running surface
83, 93 Belt
L Longitudinal axis
A, B Strand plane (belt plane)
α, β Angle of inclination
φ Angle

What is claimed is:

1. A feedback actuator for a steering device of a motor vehicle, comprising a steering shaft that is mounted so as to be rotatable about a longitudinal axis extending in a longitudinal direction, wherein by way of a belt drive the steering shaft is coupled to a motor shaft of an electric motor so as to be able to be rotatably driven, the belt drive having at least one pair of belt pulleys having two belt pulleys that are wrapped by a belt, wherein a first of the belt pulleys is operatively connected to the motor shaft and a second of the belt pulleys is operatively connected to the steering shaft, wherein the two belt pulleys of the pair of belt pulleys are disposed so as to be mutually coaxial or at a mutual angle.

2. The feedback actuator of claim 1 wherein the belt is parallel to a belt plane that is oblique relative to the longitudinal axis.

3. The feedback actuator of claim 1 wherein the two belt pulleys have in each case a conical basic shape, having belt running surfaces that on external sides of the belt pulleys that axially face away from one another conically converge in a direction of the longitudinal axis.

4. The feedback actuator of claim 1 wherein the belt drive has at least one of a flat belt, a V-belt, or a timing belt.

5. The feedback actuator of claim 1 wherein the belt drive is configured in two or more stages.

6. The feedback actuator of claim 1 comprising a layshaft disposed between the motor shaft and the steering shaft, wherein the layshaft has two coaxial belt pulleys that are connected in a rotationally fixed manner.

7. The feedback actuator of claim 6 wherein the layshaft is coaxial with the steering shaft.

8. The feedback actuator of claim 6 wherein the layshaft is coaxial with the motor shaft.

9. The feedback actuator of claim 6 wherein the layshaft is at an oblique angle relative to the steering shaft.

10. The feedback actuator of claim 6 wherein the layshaft is at an oblique angle relative to the motor shaft.

11. The feedback actuator of claim 1 comprising a tensioner installation for tensioning the belt.

12. The feedback actuator of claim 11 wherein the tensioner installation has a tensioning means that stresses a strand of the belt with a tensioning force transverse to the extent of the belt.

13. A steering column for a motor vehicle, comprising a casing unit that is attachable to a motor vehicle body and in which a steering shaft is mounted so as to be rotatable about a longitudinal axis thereof extending in a longitudinal direction, with a steering wheel being attachable to the steering column, the steering column being connected to the feedback actuator of claim 1 that has the electric motor and the belt drive for generating and coupling a feedback torque into the steering shaft.

14. The feedback actuator of claim 13 wherein the feedback actuator is disposed in an internal casing that in the longitudinal direction is adjustable relative to the casing unit.

\* \* \* \* \*